(12) United States Patent
Huang et al.

(10) Patent No.: US 8,839,030 B2
(45) Date of Patent: Sep. 16, 2014

(54) METHODS AND STRUCTURE FOR RESUMING BACKGROUND TASKS IN A CLUSTERED STORAGE ENVIRONMENT

(75) Inventors: Guolin Huang, Sunnyvale, CA (US); James A. Rizzo, Austin, TX (US); Vinu Velayudhan, Fremont, CA (US); Sumant K. Patro, Fremont, CA (US)

(73) Assignee: LSI Corporation, Milpitas, CA (US)

( * ) Notice: Subject to any disclaimer, the term of this patent is extended or adjusted under 35 U.S.C. 154(b) by 193 days.

(21) Appl. No.: 13/432,138

(22) Filed: Mar. 28, 2012

(65) Prior Publication Data

US 2013/0067274 A1 Mar. 14, 2013

Related U.S. Application Data

(60) Provisional application No. 61/532,585, filed on Sep. 9, 2011.

(51) Int. Cl.
*G06F 11/00* (2006.01)
*G06F 13/28* (2006.01)
*G06F 3/06* (2006.01)
*G06F 13/12* (2006.01)

(52) U.S. Cl.
CPC ........ *G06F 13/12* (2013.01); *G06F 2206/1012* (2013.01); *G06F 13/28* (2013.01); *G06F 3/0613* (2013.01); *G06F 3/0635* (2013.01); *G06F 3/0683* (2013.01)
USPC ........................................................ 714/13

(58) Field of Classification Search
CPC ........... G06F 3/12; G06F 13/28; G06F 3/067; G06F 3/0635; G06F 3/0689; G06F 3/0683; G06F 3/043; G06F 3/647; G06F 11/08; G06F 11/2066; H04L 67/1095; H04L 67/1097
USPC ........................................................ 714/1–57
See application file for complete search history.

(56) References Cited

U.S. PATENT DOCUMENTS

| | | | |
|---|---|---|---|
| 5,975,738 A * | 11/1999 | DeKoning et al. | 700/79 |
| 6,487,646 B1 | 11/2002 | Adams et al. | |
| 6,651,154 B1 | 11/2003 | Burton et al. | |
| 6,738,872 B2 | 5/2004 | Van Huben et al. | |
| 6,754,739 B1 | 6/2004 | Kessler et al. | |
| 6,944,785 B2 | 9/2005 | Gadir et al. | |
| 7,058,846 B1 | 6/2006 | Kelkar et al. | |
| 7,111,084 B2 * | 9/2006 | Tan et al. | 710/15 |
| 7,162,587 B2 * | 1/2007 | Hiken et al. | 711/135 |

(Continued)

OTHER PUBLICATIONS

"Common RAID Disk Data Format Specification" Version 2.0 Revision 19 SNIA Technical Position Mar. 27, 2009.

(Continued)

*Primary Examiner* — Nadeem Iqbal
(74) *Attorney, Agent, or Firm* — Duft Bornsen & Fettig

(57) ABSTRACT

Methods and structure for resuming background tasks in a storage environment. storage controller. The system is operable to receive host Input/Output (I/O) requests directed to a logical volume, and to couple with one or more of storage devices provisioning the logical volume. The system is further operable to process the host I/O requests directed to the logical volume, to initiate a background processing task distinct from the host I/O requests and related to the logical volume, and to store progress information on at least one of the one or more storage devices describing progress of the background processing task.

18 Claims, 5 Drawing Sheets

(56) References Cited

U.S. PATENT DOCUMENTS

| | | |
|---|---|---|
| 7,213,102 B2 | 5/2007 | Buchanan, Jr. et al. |
| 7,418,550 B2 | 8/2008 | Hetrick et al. |
| 7,480,941 B1 | 1/2009 | Balasubramaniam et al. |
| 7,814,065 B2 | 10/2010 | Chan et al. |
| 8,001,242 B2 | 8/2011 | Mild et al. |
| 8,041,735 B1 | 10/2011 | Lacapra et al. |
| 8,190,816 B2 | 5/2012 | Balasubramanian |
| 8,261,003 B2 | 9/2012 | Young et al. |
| 8,589,723 B2 * | 11/2013 | Kumar et al. ............ 714/4.5 |
| 2002/0103964 A1 | 8/2002 | Igari |
| 2004/0205074 A1 | 10/2004 | Berkery et al. |
| 2005/0097324 A1 | 5/2005 | Mizuno |
| 2005/0125557 A1 | 6/2005 | Vasudevan et al. |
| 2005/0188421 A1 | 8/2005 | Arbajian |
| 2005/0210317 A1 * | 9/2005 | Thorpe et al. ............. 714/6 |
| 2005/0240928 A1 | 10/2005 | Brown et al. |
| 2006/0005074 A1 * | 1/2006 | Yanai et al. ............... 714/5 |
| 2007/0015589 A1 | 1/2007 | Shimizu |
| 2007/0067497 A1 | 3/2007 | Craft et al. |
| 2007/0210162 A1 | 9/2007 | Keen et al. |
| 2009/0119364 A1 | 5/2009 | Guillon |
| 2009/0222500 A1 | 9/2009 | Chiu et al. |
| 2010/0185874 A1 | 7/2010 | Robles et al. |
| 2010/0191873 A1 | 7/2010 | Diamant |
| 2010/0274977 A1 | 10/2010 | Schnapp et al. |
| 2011/0178983 A1 | 7/2011 | Bernhard et al. |
| 2011/0225371 A1 | 9/2011 | Spry |
| 2012/0159646 A1 | 6/2012 | Hong Chi et al. |
| 2012/0216299 A1 | 8/2012 | Frank |
| 2012/0278552 A1 * | 11/2012 | Singh et al. ............. 711/114 |

OTHER PUBLICATIONS

Ciciani et al. "Analysis of Replication in Distributed Database Systems" IEEE Transactions on Knowledge and Data Engineering, vol. 2 . No. 2 . Jun. 1990.

* cited by examiner

METHODS AND STRUCTURE FOR RESUMING BACKGROUND TASKS IN A CLUSTERED STORAGE ENVIRONMENT

This patent claims priority to U.S. provisional patent application No. 61/532,585, filed on 9 Sep. 2011 and titled "IO Shipping for RAID Virtual Disks Created On A Disk Group Shared Across Cluster," which is hereby incorporated by reference.

RELATED PATENTS

This patent application is related to the following commonly owned United States patent applications, all filed on the same date herewith and all of which are herein incorporated by reference:

U.S. patent application Ser. No. 13/432,131, entitled METHODS AND STRUCTURE FOR TASK MANAGEMENT IN STORAGE CONTROLLERS OF A CLUSTERED STORAGE SYSTEM;

U.S. patent application Ser. No. 13/432,213, entitled METHODS AND STRUCTURE FOR DIRECT PASS THROUGH OF SHIPPED REQUESTS IN FAST PATH CIRCUITS OF A STORAGE CONTROLLER IN A CLUSTERED STORAGE SYSTEM;

U.S. patent application Ser. No. 13/432,223, entitled METHODS AND STRUCTURE FOR LOAD BALANCING OF BACKGROUND TASKS BETWEEN STORAGE CONTROLLERS IN A CLUSTERED STORAGE ENVIRONMENT;

U.S. patent application Ser. No. 13/432,225, entitled METHODS AND STRUCTURE FOR TRANSFERRING OWNERSHIP OF A LOGICAL VOLUME BY TRANSFER OF NATIVE-FORMAT METADATA IN A CLUSTERED STORAGE ENVIRONMENT;

U.S. patent application Ser. No. 13/432,232, entitled METHODS AND STRUCTURE FOR IMPLEMENTING LOGICAL DEVICE CONSISTENCY IN A CLUSTERED STORAGE SYSTEM;

U.S. patent application Ser. No. 13/432,238, entitled METHODS AND STRUCTURE FOR IMPROVED I/O SHIPPING IN A CLUSTERED STORAGE SYSTEM;

U.S. patent application Ser. No. 13/432,220, entitled METHODS AND STRUCTURE FOR MANAGING VISIBILITY OF DEVICES IN A CLUSTERED STORAGE SYSTEM; and U.S. patent application Ser. No. 13/432,150, entitled METHODS AND STRUCTURE FOR IMPROVED BUFFER ALLOCATION IN A STORAGE CONTROLLER.

BACKGROUND

1. Field of the Invention

The invention relates generally to clustered storage systems and more specifically relates to resuming processing of background tasks after a failover occurs.

2. Discussion of Related Art

In the field of data storage, customers demand highly resilient data storage systems that also exhibit fast recovery times for stored data. One type of storage system used to provide both of these characteristics is known as a clustered storage system.

A clustered storage system typically comprises a number of storage controllers, wherein each storage controller processes host Input/Output (I/O) requests directed to one or more logical volumes. The logical volumes reside on portions of one or more storage devices (e.g., hard disks) coupled with the storage controllers. Often, the logical volumes are configured as Redundant Array of Independent Disks (RAID) volumes in order to ensure an enhanced level of data integrity and/or performance.

A notable feature of clustered storage environments is that the storage controllers are capable of coordinating processing of host requests (e.g., by shipping I/O processing between each other) in order to enhance the performance of the storage environment. This includes intentionally transferring ownership of a logical volume from one storage controller to another. For example, a first storage controller may detect that it is currently undergoing a heavy processing load, and may assign ownership of a given logical volume to a second storage controller that has a smaller processing burden in order to increase overall speed of the clustered storage system. Other storage controllers may then update information identifying which storage controller presently owns each logical volume. Thus, when an I/O request is received at a storage controller that does not own the logical volume identified in the request, the storage controller may "ship" the request to the storage controller that presently owns the identified logical volume.

FIG. 1 is a block diagram illustrating an example of a prior art clustered storage system 150. Clustered storage system 150 is indicated by the dashed box, and includes storage controllers 120, switched fabric 130, and logical volumes 140. Note that a "clustered storage system" (as used herein) does not necessarily include host systems and associated functionality (e.g., hosts, application-layer services, operating systems, clustered computing nodes, etc.). However, storage controllers 120 and hosts 110 may be tightly integrated physically. For example, storage controllers 120 may comprise Host Bus Adapters (HBA's) coupled with a corresponding host 110 through a peripheral bus structure of host 110. According to FIG. 1, hosts 110 provide I/O requests to storage controllers 120 of clustered storage system 150. Storage controllers 120 are coupled via switched fabric 130 (e.g., a Serial Attached SCSI (SAS) fabric or any other suitable communication medium and protocol) for communication with each other and with a number of storage devices 142 on which logical volumes 140 are stored.

FIG. 2 is a block diagram illustrating another example of a prior art clustered storage system 250. In this example, clustered storage system 250 processes I/O requests from hosts 210 received via switched fabric 230. Storage controllers 220 are coupled for communication with storage devices 242 via switched fabric 235, which may be integral with or distinct from switched fabric 230. Storage devices 242 implement logical volumes 240. Many other configurations of hosts, storage controllers, switched fabric, and logical volumes are possible for clustered storage systems as a matter of design choice. Further, in many high reliability storage systems, all the depicted couplings may be duplicated for redundancy. Additionally, the interconnect fabrics may also be duplicated for redundancy.

While clustered storage systems provide a number of performance benefits over more traditional storage systems described above, the speed of a storage system still typically remains a bottleneck to the overall speed of a processing system utilizing the storage system.

For example, if a first storage controller processing a background task encounters a failure and stops functioning, it may be necessary to transfer ownership of a logical volume controlled by the storage controller to a second storage controller. The second storage controller may then initiate processing of host I/O requests directed to the logical volume. Further, because the second storage controller does not have access to the failed storage controller, the second storage controller may have to re-start, "from scratch," the background task that was initiated by the first storage controller. Restarting a background task may therefore waste significant processing already performed by the failed controller and further extend the time to complete the background task. A background task could comprise, for example, a patrol read of a storage device, an expansion of a logical volume, or an initialization related to a logical volume. If the logical volume is a RAID volume, the potential background tasks could further comprise consistency checks for the logical volume, a rebuild for the logical volume, a copy back for the logical volume, or a migration of the logical volume from one RAID level to another.

Thus it is an ongoing challenge to increase the performance of clustered storage systems as related to processing of background tasks.

SUMMARY

The present invention addresses the above and other problems, thereby advancing the state of the useful arts, by providing methods and structure for a storage controller to store information on a storage device describing the progress of a background task. A storage controller assuming control of a logical volume from the failed over storage controller may thus resume processing of the background task using the progress information maintained at the storage device. As such, the background tasks need not be resumed "from scratch" at the new storage controller.

In one aspect hereof, a method operable in a storage controller for managing a logical volume provisioned on one or more storage devices is provided. The method comprises receiving host Input/Output (I/O) requests directed to the logical volume, and processing the host I/O requests directed to the logical volume. The method further comprises initiating a background processing task distinct from the host I/O requests and related to the logical volume, and storing progress information on at least one of the one or more storage devices describing progress of the background processing task.

Another aspect hereof provides a storage controller. The storage controller comprises a front-end interface operable to receive host Input/Output (I/O) requests directed to a logical volume, a back-end interface operable to couple with one or more of storage devices provisioning the logical volume, and a control unit. The control unit is operable to process the host I/O requests directed to the logical volume, to initiate a background processing task distinct from the host I/O requests and related to the logical volume, and to store progress information on at least one of the one or more storage devices describing progress of the background processing task.

Another aspect hereof provides a storage system comprising one or more storage devices, a first storage controller, and a second storage controller. The first storage controller is coupled with the one or more storage devices, is operable to manage a logical volume provisioned on the one or more storage devices, and is further operable to process host I/O requests directed to the logical volume. Additionally, the first storage controller is operable to initiate a background processing task distinct from the host I/O requests and related to the logical volume, and to store progress information on at least one of the one or more storage devices describing progress of the background processing task. The second storage controller is operable to detect a failure of the first storage controller and to acquire the progress information from the at least one of the one or more storage devices. The second storage controller is further operable to resume the background processing task based on the acquired information.

DETAILED DESCRIPTION OF THE DRAWINGS

Figure 1:
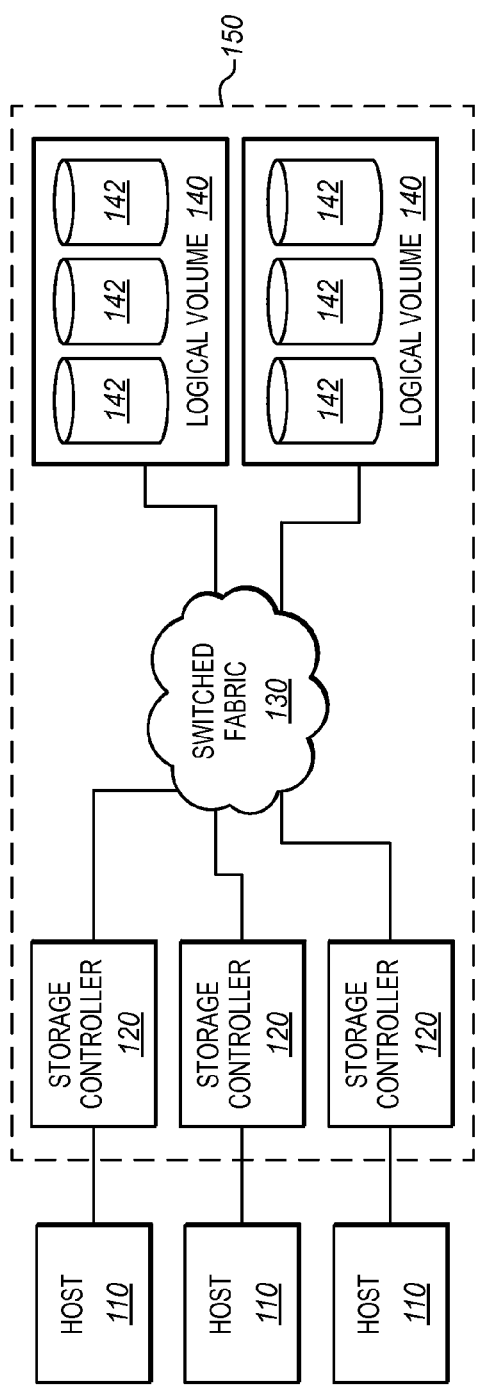
FIG. 1 is a block diagram illustrating an example of a prior art clustered storage system.
Figure 2:
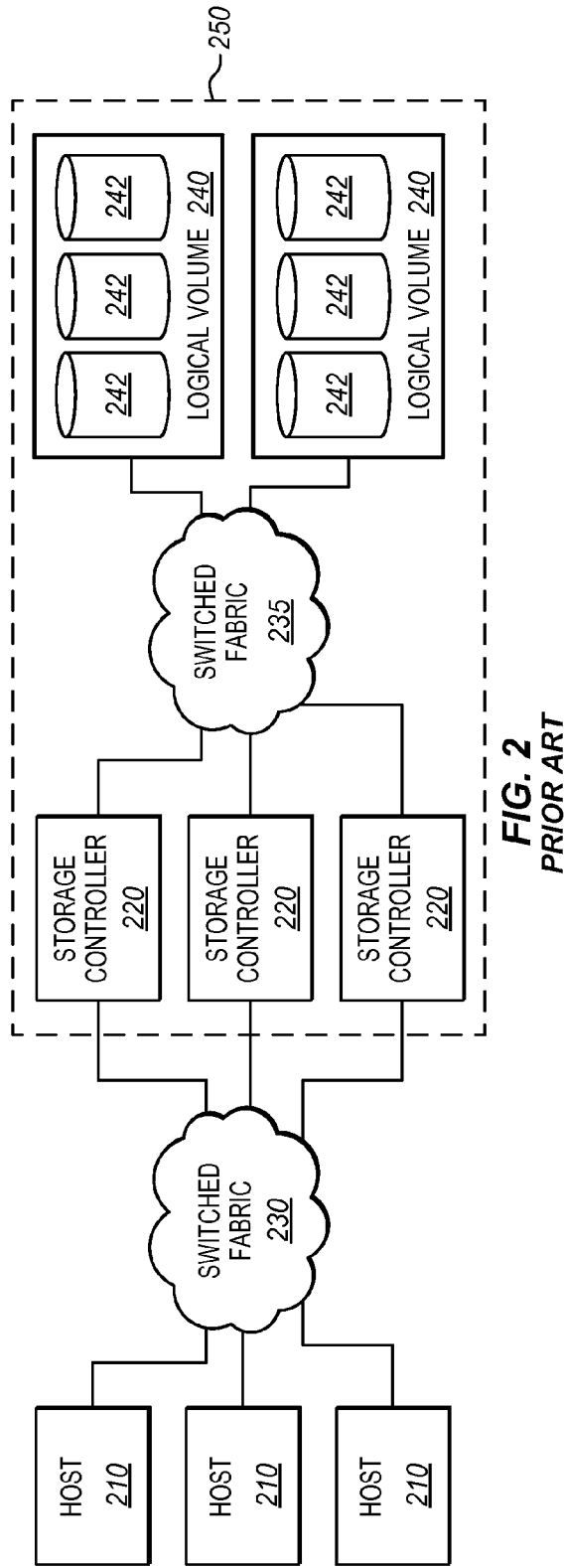
FIG. 2 is a block diagram illustrating another example of a prior art clustered storage system.
Figure 3:
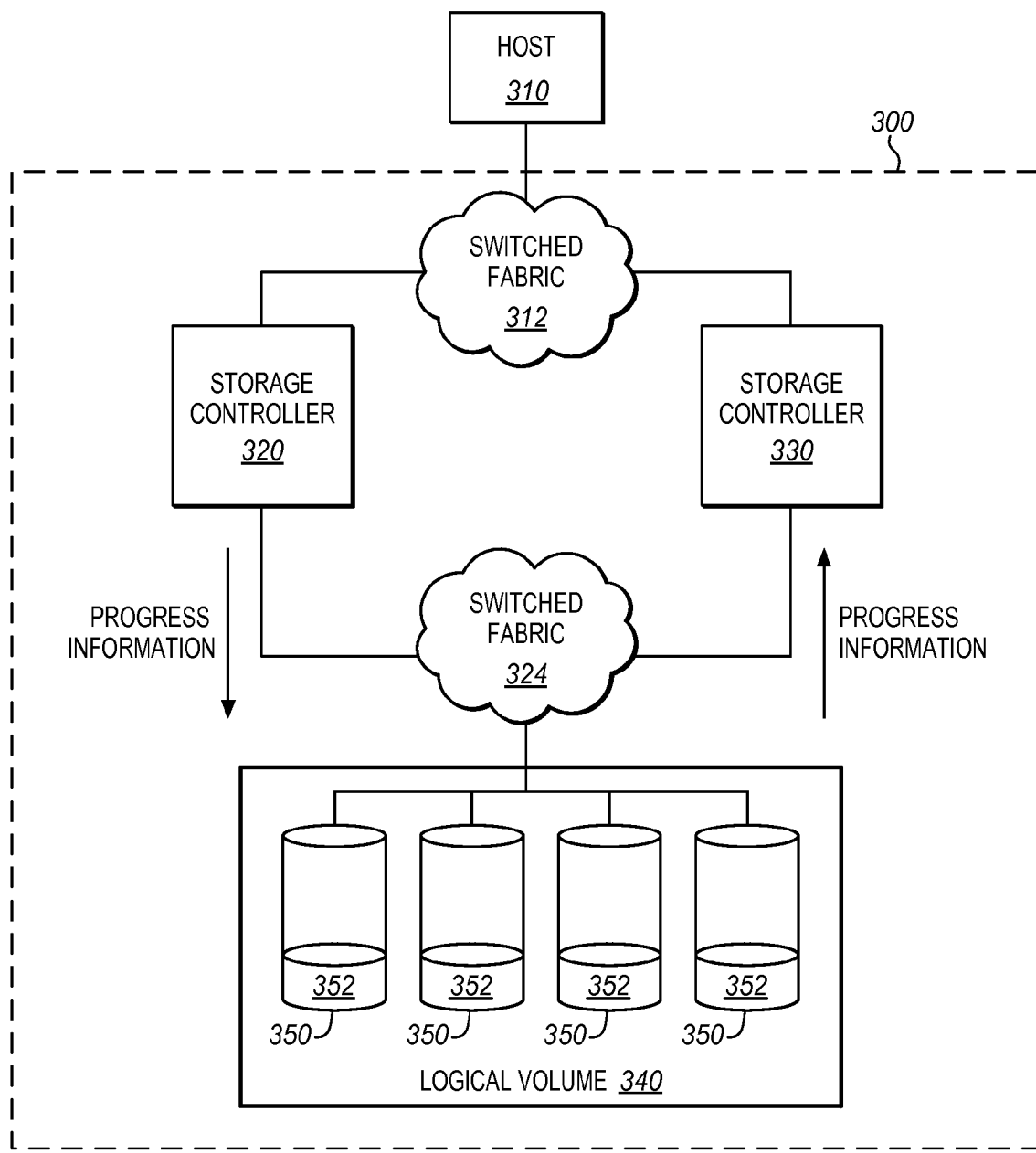
FIG. 3 is a block diagram of an exemplary clustered storage system in accordance with features and aspects hereof.

FIG. 3 is a block diagram of an exemplary storage system 300 in accordance with features and aspects hereof. According to FIG. 3, storage system 300 receives input from a host 310, and comprises switched fabrics 312 and 324, storage controllers 320 and 330, logical volume 340, and storage devices 350 provisioning logical volume 340. Utilizing storage system 300, progress information indicating the progress of a background task may be maintained by one or more of storage controllers 320 and 330 on at least one of storage devices 350. In this manner, if a storage controller fails, another storage controller may resume the background task from substantially the point where the failed storage controller stopped.

Storage controllers 320 and 330 may receive host Input/Output (I/O) requests via switched fabric 312. Storage controllers 320 and 330 utilize switched fabric 324 to manage logical volume 340 provisioned on storage devices 350.

Host 310 may comprise any suitable system capable of performing processing operations upon stored data. For example, host 310 may comprise a processor implementing programmed instructions or custom circuitry implementing logic for performing a task. Host 310 is communicatively coupled with switched fabric 312 via a communication channel, and may provide host I/O requests to storage controller 320 and/or 330. If storage controllers 320-330 are configured in an active-passive mode, host 310 may provide host I/O requests to a previously passive storage controller upon failure of the active storage controller (e.g., during/after the passive storage controller assumes the active role). Note that a failure may comprise storage controller 320 unexpectedly failing, and may also comprise a "planned failover" wherein storage controller 320 is intentionally shut down as part of a planned process. Host I/O requests directed to a logical volume include requests to provide data from the logical volume to a host as well as requests to modify or write data in the logical volume.

Switched fabric 312 and switched fabric 324 comprise any suitable combination of communication channels operable to forward communications, for example, according to protocols for one or more of Serial Attached SCSI (SAS), Fibre-Channel, Ethernet, ISCSI, etc. Switched fabric 312 and switched fabric 324 may be distinct from, or integral with, each other as a matter of design choice.

Storage controller 320 is operable to receive host I/O requests via switched fabric 312, and to perform operations upon storage devices 350 provisioning logical volume 340 based upon those requests. Storage controller 330 is operable to assume control of logical volume 340 upon failure of storage controller 320. For example, storage controller 330 may be one of many active storage controllers of a clustered storage system, presently managing one or more logical volumes yet still capable of assuming ownership of logical volume 340 upon detecting a failure of storage controller 320. In another example, storage controller 330 may be a passive storage controller awaiting a failure of storage controller 320.

Logical volume 340 comprises allocated storage space and data provisioned on storage devices 350. While in this embodiment logical volume 340 is provisioned using all shown storage devices 350, logical volume 340 may be provisioned on a greater or lesser number of storage devices 350 as a matter of design choice. Furthermore, storage devices 350 need not be dedicated to only logical volume 340, but may also store data for a number of other logical volumes. Typically, logical volume 340 will be configured as a Redundant Array of Independent Disks (RAID) volume in order to enhance the performance and/or reliability of data stored at logical volume 340.

Storage devices 350 provision the storage capacity of logical volume 340, and may comprise any media and/or interfaces capable of storing and/or retrieving data in a computer-readable format. For example, storage devices 350 may comprise magnetic hard disks, solid state drives, optical media, etc. compliant with protocols for one or more of SAS, SATA, Fibre Channel, etc. The number of storage devices 350 utilized by storage system 300 may vary as a matter of design choice.

While in operation, storage controller 320 of storage system 300 is operable to process incoming host I/O requests directed to logical volume 340. Additionally, storage controller 320 is capable of determining that a background task distinct from the host I/O requests and related to logical volume 340 should be performed. Background tasks relating to a logical volume include processing (unrelated to host I/O requests for the volume) that is directed to any or all storage devices that provision the logical volume. During processing of the background task, storage controller 320 is operable to store information 352 at storage devices 350 indicating the progress of the background task.

As used herein, the term "background task" refers to a processing task that is distinct from host I/O requests directed to logical volume 340. For example, a background task could comprise a patrol read of a storage device 350, an expansion of logical volume 340, or an initialization related to logical volume 340. If logical volume 340 is a RAID volume, the potential background tasks could further comprise consistency checks for logical volume 340, a rebuild for logical volume 340, a copy back for logical volume 340, or a migration of logical volume 340 to a different RAID level.

Background tasks are typically initiated by internal firmware triggers at a storage controller based upon firmware, initiated by a management component of storage system 300, etc. A host may also schedule certain background tasks, but the background tasks are not triggered by host I/O requests directed to a logical volume.

A background task is distinct from host I/O requests directed to a logical volume. For example, some background tasks (e.g., patrol reads, consistency checks, initializations) involve reading data from storage devices provisioning the logical volume, but do not involve providing the read data to a host or even writing any data to the storage devices. Other background tasks (e.g., migrations, expansions, rebuilds) involve writing to storage devices to alter the way in which the logical volume is stored on the storage devices, but similarly do not involve modifying the data stored for the logical volume (i.e., to the host, there is no change in the data stored on the volume). Thus, to a host system, background tasks are generally undetectable because they do not alter the data stored for the logical volume nor do they provide data that has been read from the logical volume to a host.

Progress information 352 may be stored at any location of one or more of storage devices 350 in order to indicate the progress in processing a background task. For example, progress information may be stored in a section of one or more storage devices 350 reserved for such purposes. In some exemplary embodiments, the progress information may be stored, appended, or inserted into an area normally reserved for other data. Such an area may, for example, comprise Disk Data Format (DDF) data residing on each storage device. The DDF standards are described in detail in the Common RAID Disk Data Format Specification of the Storage Networking Industry Association (SNIA), (e.g., version 2.0, revision 19, published 27 Mar. 2009, herein incorporated by reference). In further embodiments, the progress information may be stored in vendor-unique locations within the area reserved for DDF data.

The progress information itself may include a variety of parameters. Notably, the progress information may include a "progress point" or other content indicating a location from which the background task may be resumed in order to successfully complete the background task. A progress point may include, for example, a Logical Block Address (LBA), a physical address of a storage device, etc. Further, the specific information provided by each progress point may vary depending upon the type of task performed (e.g., it may be different for an initialization than for a patrol read). For example, a progress point may indicate a percentage of completion. Another example of a progress point (e.g., for a rebuild operation) may describe the number of blocks completed and the total number of blocks to rebuild.

Because the progress information is maintained at storage devices 350, it may be undesirable to continuously update progress information owing to the limited speed of writing at storage devices 350. Thus, it may be desirable to instead update the progress information on a periodic basis at storage devices 350 or to update progress information at certain defined thresholds of progress being achieved (e.g., percentages of completion). This reduces resource utilization at storage device(s) 350, with the trade-off that a storage controller resuming the background task may duplicate a portion of the task that was already performed by the previous storage controller. Even so, this is still typically far less duplication than simply restarting the background task from the beginning.

Figure 4:
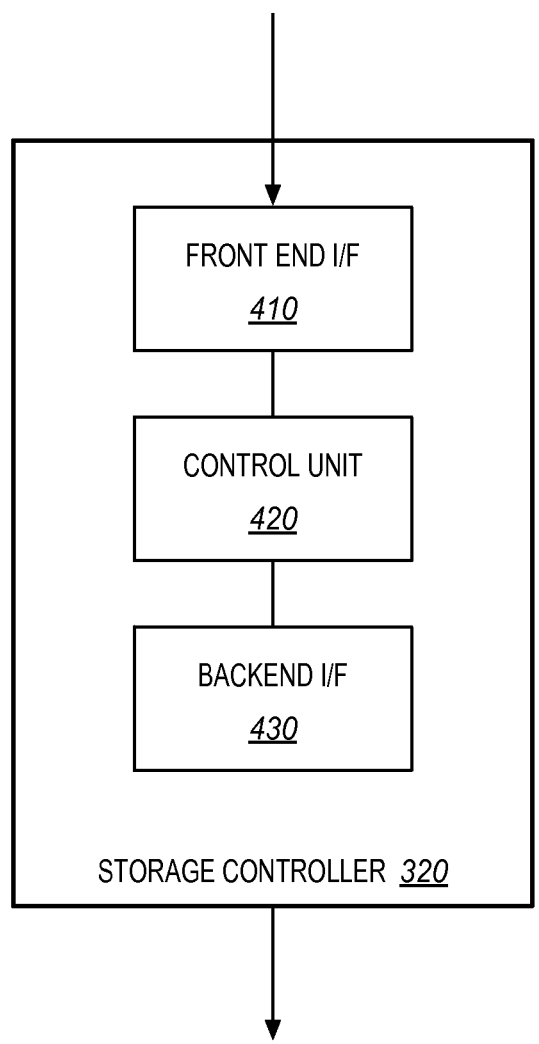
FIG. 4 is a block diagram of an exemplary storage controller in accordance with features and aspects hereof.

FIG. 4 is a block diagram of an exemplary storage controller 320 in accordance with features and aspects hereof FIG. 4 may be equally applicable to an exemplary storage controller 330. According to this embodiment, storage controller 320 comprises frontend Interface (I/F) 410, control unit 420, and backend Interface (I/F) 430. Frontend I/F 410 comprises any communication channel suitable for receiving host I/O requests directed to a logical volume (e.g., logical volume 340 of FIG. 3). Backend I/F comprises any communication channel suitable for directing the operations of storage devices implementing the logical volume (e.g., storage devices 350 of FIG. 3).

Control unit 420 is operable to process received host I/O requests and determine operations to perform upon the storage devices based upon the received host I/O requests. Further, control unit 420 is capable of determining that a background task should be performed relating to the logical volume, and to maintain progress information at a storage device describing the task. This enables another storage controller assuming control of the logical volume to resume processing of the background task, even if storage controller 320 fails unexpectedly. Such an other controller, assuming ownership of a logical volume upon failure of storage controller 320, accesses the progress information on the storage devices to determine a point of progress at which to resume processing of the background task.

Figure 5:
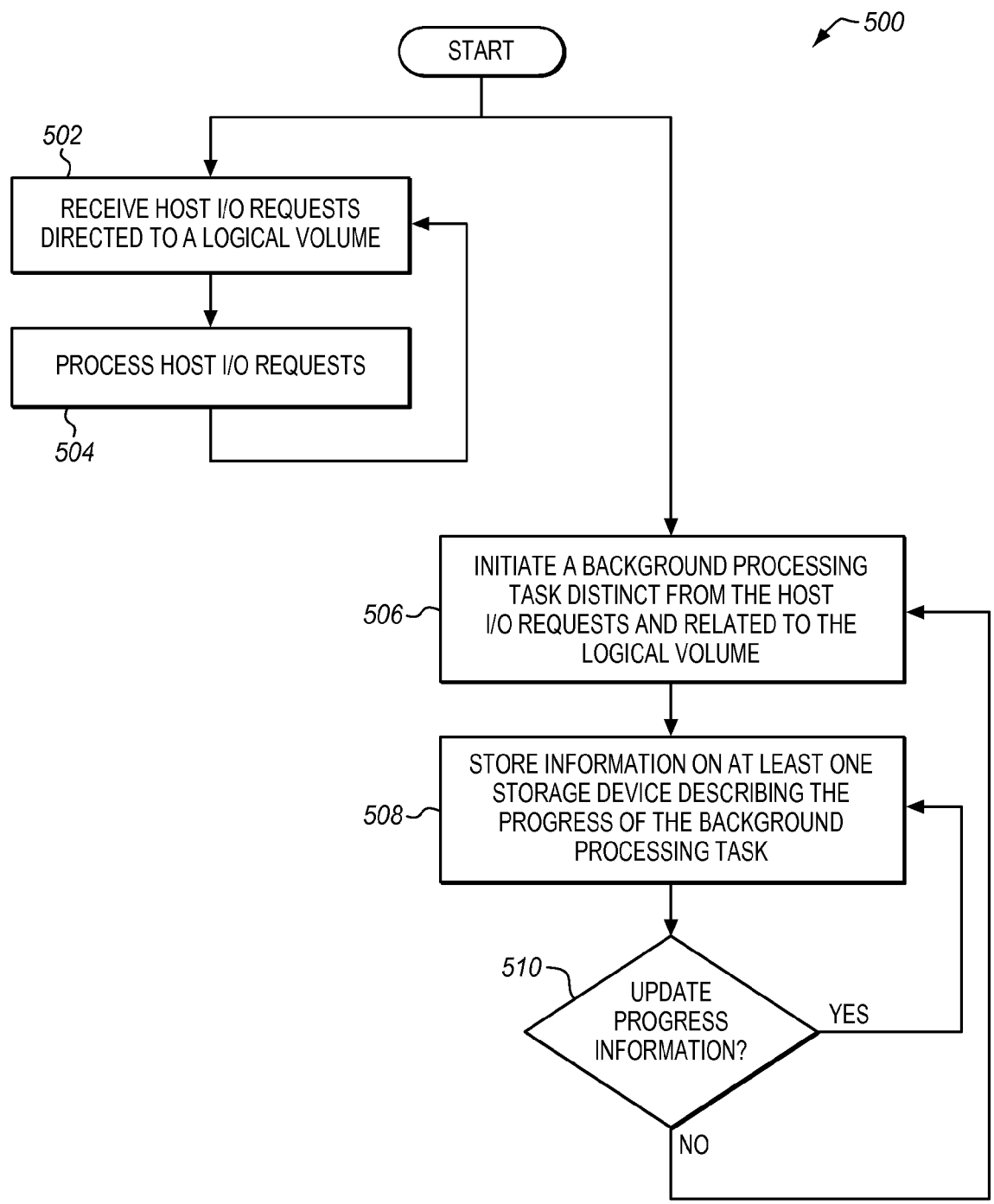
FIG. 5 is a flowchart describing an exemplary method in accordance with features and aspects hereof to store progress information describing a background task to a storage device.

FIG. 5 is a flowchart describing an exemplary method 500 in accordance with features and aspects hereof to store progress information for a background task at a storage device. The method of FIG. 5 may be operable in a storage system such as described above with regard to FIG. 3. According to FIG. 5, steps 502 and 504 may be implemented in parallel with, and asynchronously from, steps 506 and 508. Thus, steps 502 and 504 represent one ongoing (and iteratively operable) process that may occur at the same or different times than another ongoing (and iteratively operable) process represented by steps 506 and 508.

Step 502 comprises receiving, at a storage controller, host Input/Output (I/O) requests directed to a logical volume. The host I/O requests may, for example, include commands for reading from or writing to the logical volume in order to store and/or retrieve information therefrom. Step 504 comprises processing host I/O requests directed to the logical volume. This may comprise writing to and/or reading from the storage devices implementing the logical volume to provide stored data to a host or modify data stored on the logical volume.

While host I/O is being received and processed in steps 502 and 504, an independent event may trigger a background task. For example, the background task may be triggered based upon internal firmware operations at the active storage controller, based upon an administrative user (e.g., via a debug or administrative input) requesting the operation, based upon the results of a prior background task, based upon an error rate for operations performed on the storage devices implementing the logical volume, based upon a timer, etc. Therefore, step 506 comprises initiating, at the storage controller, a background task distinct from the host I/O requests and related to the logical volume.

As the background task is processed, the storage controller stores progress information indicating a point from which the task may be resumed in step 508. Thus, if another storage controller assumes control of the background task (e.g., after a failover of the storage controller processing the background task), the background task can be resumed at least from the indicated level of progress instead of from the beginning.

In step 510, the storage controller determines whether to update previously stored progress information for a background task. This may be desirable when a background task is particularly long or processing-intensive. The progress information may be updated, for example, based upon a given threshold of progress, based upon the passage of time, based upon a number of read/write operations performed on one or more storage devices by the storage controller, and/or many other factors. If it is appropriate to update the progress information, then the storage controller updates the storage information as indicated at step 508. However, if no further progress information need be stored for the background task, processing may continue to step 506 wherein the storage controller awaits to initiate a next background task.

Figure 6:
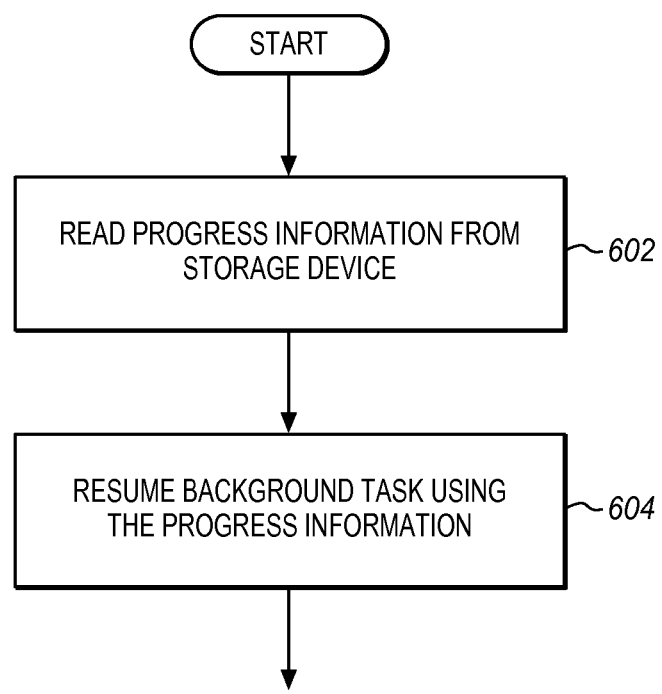
FIG. 6 is a flowchart describing an exemplary method in accordance with features and aspects hereof to acquire stored progress information describing a background task to resume processing of the background task.

FIG. 6 is a flowchart describing an exemplary method 600 in accordance with features and aspects hereof to acquire stored progress information describing a background task to resume processing of the background task. Assume, for this embodiment, that a storage controller implementing method 500 of FIG. 5 has failed, resulting in a transfer of ownership of a logical volume from the failed storage controller to a new storage controller. The new storage controller, implementing method 600, is capable of completing a partially finished background task of the failed storage controller relating to the logical volume.

In step 602, the new storage controller reads progress information from one or more storage devices implementing the logical volume. This progress information may be found in a known, predetermined location of one or more of the storage devices (e.g., a location reserved for DDF data, a specific set of addresses on the storage devices, etc.). Based upon the information that has been read, the new storage controller may determine the type of background task(s) that were being performed prior to failure, as well as the extent of progress for each. For example, the progress information may indicate the last Logical Block Address (LBA) or physical address for which a segment of the background task was completed. The progress information may further include reporting information that describes whether any errors or issues have already been detected and/or resolved during the processing of the background task. For example, this information may describe the number of errors, the type of each error, how each error has been resolved or should be resolved, etc. Still further, the progress information may describe an amount of time that has elapsed since the start of the operation. This may be useful for a management application reviewing progress of the background task.

In step 604, the new storage controller resumes the background task utilizing the progress information that has been read. This may comprise, for example, proceeding onward with a patrol read, consistency check, etc., based on the progress information. Upon completion of the background task, the new storage controller may generate a report or other indication of completion for internal storage, transmission to a host system or administrator, etc.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A storage system comprising:
   one or more storage devices;
   a first storage controller coupled with the one or more storage devices, the first storage controller operable to manage a logical volume provisioned on the one or more storage devices, further operable to process host I/O requests directed to the logical volume, further operable to initiate a background processing task distinct from the host I/O requests and related to the logical volume, and further operable to store progress information on at least one of the one or more storage devices describing progress of the background processing task; and
   a second storage controller operable to detect a failure of the first storage controller, further operable to acquire the progress information from the at least one of the one or more storage devices, and further operable to resume the background processing task based on the acquired information.

2. The storage system of claim 1 wherein
the background processing task comprises at least one of a patrol read, an expansion, or an initialization.

3. The storage system of claim 1 wherein
the logical volume is a Redundant Array of Independent Disks (RAID) volume, and
the background processing task comprises at least one of a consistency check, a rebuild, a copy back, or a migration from one RAID level to another.

4. The storage system of claim 1 wherein
the first storage controller is further operable to internally trigger the background processing task.

5. The storage system of claim 1 wherein
the first storage controller is further operable to store the progress information in an area of the storage devices reserved for storing the progress data.

6. The storage system of claim 5 wherein
the area of the storage devices is reserved for storing Disk Data Format (DDF) data.

7. The storage system of claim 1 wherein
the progress information describes a point from which the background processing task may be resumed in order to complete the background processing task.

8. The storage system of claim 7 wherein
the progress point comprises a Logical Block Address (LBA) for the logical volume from which the background processing task may be resumed.

9. The storage system of claim 7
the progress point comprises a physical address of one or more of the storage devices from which the background processing task may be resumed.

10. A method operable in a storage system, the method comprising:
via a first storage controller, managing a logical volume provisioned on one or more storage devices coupled to the first storage controller;
processing host I/O requests directed to the logical volume;
initiating a background processing task distinct from the host I/O requests and related to the logical volume; and
storing progress information on at least one of the one or more storage devices describing progress of the background processing task; and
via a second storage controller, detecting a failure of the first storage controller;
acquiring the progress information from the at least one of the one or more storage devices; and
resuming the background processing task based on the acquired information.

11. The method of claim 10 wherein
the background processing task comprises at least one of a patrol read, an expansion, or an initialization.

12. The method of claim 10 wherein
the logical volume is a Redundant Array of Independent Disks (RAID) volume, and
the background processing task comprises at least one of a consistency check, a rebuild, a copy back, or a migration from one RAID level to another.

13. The method of claim 10 further comprising
via the first storage controller, internally triggering the background processing task.

14. The method of claim 10 further comprising
via the first storage controller, storing the progress information in an area of the storage devices reserved for storing the progress data.

15. The method of claim 14 wherein
the area of the storage devices is reserved for storing Disk Data Format (DDF) data.

16. The method of claim 10 wherein
the progress information describes a point from which the background processing task may be resumed in order to complete the background processing task.

17. The method of claim 16 wherein
the progress point comprises a Logical Block Address (LBA) for the logical volume from which the background processing task may be resumed.

18. The method of claim 16 wherein
the progress point comprises a physical address of one or more of the storage devices from which the background processing task may be resumed.

* * * * *